United States Patent Office 3,515,047
Patented June 2, 1970

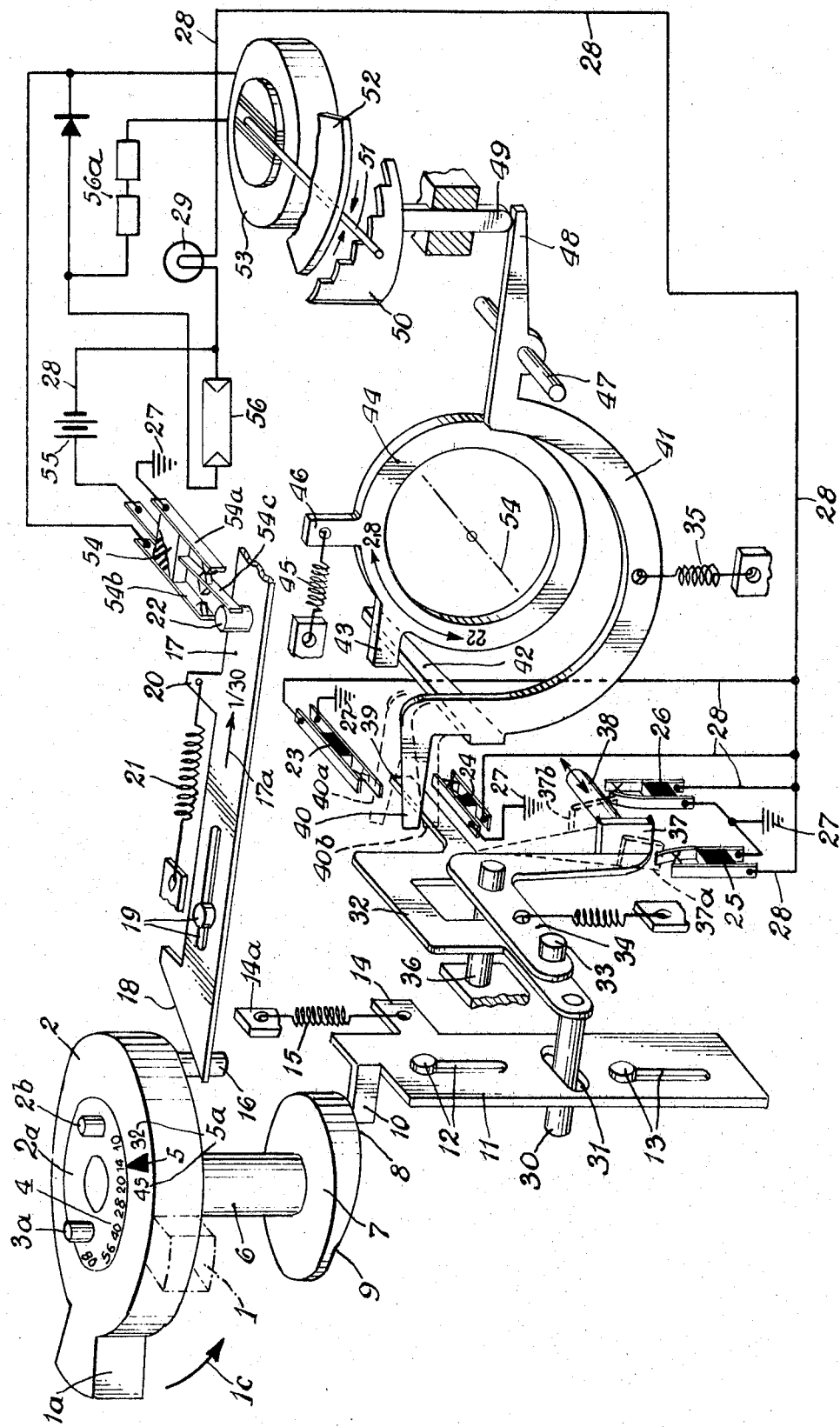

3,515,047
PHOTOGRAPHIC CAMERA WITH FLASH
EXPOSURE RANGE
Johann Hahn, Stuttgart, Germany, assignor to Zeiss Ikon
Aktiengesellschaft, Stuttgart, Germany, a corporation
of Germany
Filed Oct. 16, 1967, Ser. No. 675,509
Claims priority, application Germany, Oct. 29, 1966,
Z 12,500
Int. Cl. G03b 19/00
U.S. Cl. 95—11        4 Claims

ABSTRACT OF THE DISCLOSURE

A photographic camera having a customary distance adjusting mechanism and a diaphragm adjusting mechanism is provided with a daylight exposure range and an automatic flash exposure range. The automatic flash exposure range includes a flash guide number adjusting mechanism.

For the purpose of indicating in the viewfinder of the camera the limits of distance and diaphragm aperture within which correctly exposed flash pictures may be taken a warning light is caused to appear in the viewfinder. This warning light is arranged in an electric circuit controlled by switches actuated by the distance adjusting mechanism and guide number adjusting mechanism. When the switches are closed, the warning light is energized and indicates that the camera has been adjusted to values which would result in an incorrectly exposed flash picture.

---

The invention relates to a photographic camera which is provided with a daylight exposure range, preferably an automatic daylight exposure mechanism, and with a flash exposure range, likewise preferably with an automatic flash exposure mechanism.

In such an automatic flash exposure mechanism the diaphragm, as known, is automatically formed according to the guide numbers and distance values selected so that the camera user need not make any calculations as to a correct diaphragm setting.

An important feature of automatic flash exposure mechanisms is that the guide number adjusting member and the distance adjusting member or parts connected with these adjusting members are provided with deflecting cams which are engaged and scanned by sensing members, preferably levers. These guide number and distance sensing levers are combined to form a lever differential in that the axis of rotation of one lever, for instance the guide number sensing lever, is supported by the other stationary lever, e.g. the distance sensing lever. Thus, the axis of rotation of the guide number sensing lever is bodily shiftable, and the position of the axis of rotation depends upon the given distance values relayed to the distance sensing lever. Since, then, the guide number sensing lever is the recipient of both the guide number value settings and the distance value settings, it represents in its rotative position the sum of both values, and it is now possible to control with this guide number sensing lever the diaphragm mechanism for the purpose of having the flash diaphragm adjusted.

It is also known in the automatic flash exposure range to have the distance range adjustable by the camera operator so restrict itself in dependence upon the guide number that over- or underexposures are avoided.

For example, the selection of a guide number 80 and a distance of one meter would result in a considerable overexposure, because the diaphragm aperture 1:80 required for the mentioned values to assure a proper blackening of the film cannot be furnished by the objective lens whose smallest diaphragm aperture of which may assumed to be the conventional 1:22. Therefore, the distance range has to be restricted to distances of about four meters or more. Generaly for flash exposures, distances of eight meters are considered the maximum and one meter the minimum, whereby the limits may be excluded.

The other extreme, e.g. a guide number 10 and a distance of ten meters, would lead to an underexposure. Again, a diaphragm aperture 1:1 required in this case according to the flash exposure relation $$\text{diaphragm} = \frac{\text{guide number}}{\text{distance}}$$

for a proper exposure of the film is beyond the capacity of the objective the maximum light intensity of which may asumed to be 1:2.8. Therefore, a restriction of the distance range to values of about one meter to 3.5 meters is necessary.

The automatic distance restrictions heretofore were produced with mechanical means which would become too complex if a mechanically operated finder indicator were to be connected with them.

It is the object of the invention to solve the problem of an automatic distance restriction in combination with a finder indication of the restricted and unrestricted condition of distance values in a simple and effective manner with a minimum requirement of parts.

This is accomplished in that one feature of the invention provides for switches which are actuated by the camera adjustment members and/or the control members for producing the flash exposure diaphragm and which close a warning signal circuit cooperating with a finder indicator when the selected combination of guide number and distance value would not produce a correctly exposed flash picture.

Another feature of the invention is that in an alarm signal circuit fed by a battery, the latter preferably being arranged in the camera anyway, switches are provided which are so arranged that they are directly or indirectly controlled by the distance adjusting member.

These switches according to the invention are disposed parallel to each other and are disposed with respect to the distance adjusting member in such a manner that one switch is closed when overstepping the lowest permissible distance palue and the other switch is closed when overstepping the highest permissible distance value.

By the action of the switches controlled by the distance adjusting means the camera user, as he is looking into the viewfinder, is simultaneously reminded of the fact that the distance setting in the flash exposure range is subject to limitations. The lighting up of the warning lamp indicates to him that he is about to leave the distance range limited to about one to eight meters and then he has to turn back the distance adjusting means until the signal disappears.

According to another feature of the invention, switches are provided in the warning signal circuit which are so arranged with respect to the control member determining the aperture of the flash diaphragm that the warning signal circuit is closed upon reaching the smallest possible and the largest possible diaphragm aperture, respectively. These switches are likewise arranged in parallel.

The switches actuated by the diaphragm control member call the photographer's attention to his being at the ends of the diaphragm adjusting ranges of for example 2.8 or 22. The lighting up of the warning lamp in the viewfinder tells him that he is in the region of the terminal stops of the diaphragm mechanism and that, with the given constant guide number setting, any further proceeding along the line of improper distance selection will only lead to an undue strain on the sensitive stops in the diaphragm mechanism.

Another significant object of the invention resides in the combination of the aforementioned features providing for switches in the warning signal circuit which are controlled by the distance adjusting member as well as by the diaphragm control member.

With this combination the camera user is given a guide number dependent locking indicator which shows him what distance values are at all permissible with the given guide number setting, and at what point diaphragm values are reached which due to a turning back of the distance values the objective is capable of producing.

It has already been stated that the switches instrumental in indicating the limits of the diaphragm range are controlled by a diaphragm control member which in its position represents the sum of the selected distance and guide number values.

Now it is possible that in combination with a large guide number, e.g. 80, a distance value is selected which is so small that in view of the given diaphragm restriction values a completely overexposed picture would be produced. Assuming that a distance of one meter has been adjusted, then the required diaphragm aperture of 80 cannot be furnished by the objective the smallest diaphragm ratio of which is 1:22.

Hence, according to the invention, with a distance set at one meter the diaphragm mechanism stops at 22 which results in a closing of the respective switch and a lighting up of the alarm signal.

Moreover, in the event a distance of one meter is already regarded as a value to be precluded, the switch controlled by the distance adjusting member has closed its contacts. Thereby the warning signal circuit is closed by way of the switch for the diaphragm range restriction as well as by the switch for the distance range restriction.

Since the selection of a guide number depends on the flash device used, the guide number cannot be changed. Therefore, the camera user has to manipulate the distance setting until a diaphragm value is reached which is within the range of the respective objective. For instance, distances of two meters or three meters prove to be still insufficient since the diaphragm values therefor should be 40 and 27, respectively, and the diaphragm is not capable of producing such values. Although the switch controlled by the distance adjusting member opens its contacts, the warning lamp continues to signal because the switch controlled by the diaphragm control member remains closed.

Only at a distance range of four meters does this switch also open its contacts, for now a diaphragm aperture of 20 is required and is capable of being produced by the objective.

The inverse analogue exists when for instance the guide member 10 is selected. In that case very short-distance values are permissible, while greater distance values must be excluded because of the danger of under-exposure. Generally, only an exposure range of from one to eight meters is permissible and the two limits themselves may also be regarded as not practicable.

Although a distance of one meter in combination with a guide number 10 calls for an absolutely possible diaphragm aperture of 10, this value combination still must be excluded from the practicable exposure values because due to the generally not permissible distance value of one meter the switch controlled by the distance adjusting member would close the warning signal circuit. By selecting distances of two and three meters, however, this switch opens its contacts and causes the warning signal to disappear. With all these aforementioned distance values, none of the switches of the diaphragm limiting ranges has responded because in each case realizable diaphragm values of 10, 5 and 3.3 were produced.

If, however, a distance of four meters in combination with a guide number 10 is selected, then one of the switches of the diaphragm limiting ranges responds since now a diaphragm aperture of 2.5 would result which an objective having a maximum light intensity of 1:2.8 is incapable of producing. Therefore, due to the closing of this switch the warning signal lights up and the distance adjusting member has to be rotated back to smaller distance values until the warning light disappears. The switches controlled by the distance adjusting member have remained open at the mentioned distance values with the exception of that of one meter.

In the following the invention will be described in more detail with reference to the single figure of the drawing which illustrates in a perspective view the operating mechanism of a camera provided with a flash exposure range. Proceeding from the premises that a number of flash exposures are made consecutively with the same guide number, this guide number has been pre-set and is introduced into the camera mechanism by the pressure of a finger upon the operating handle which at the same time constitutes the range selecting member. As the handle is disengaged, the camera is automatically switched back from the flash exposure range to the daylight exposure range.

Referring to the drawing, with 1 is designated the operating handle serving for changing the camera from the automatic daylight exposure range to the automatic flash exposure range and vice versa. The handle 1 is attacked to a ring-shaped carrier 2 and the two possible operative positions of the handle 1 are designated with 1 and 1a of which the position 1a shown in solid lines represents the automatic flash exposure range and the dash-dotted position 1 signifies the automatic daylight exposure range. The carrier 2 is acted upon by a not illustrated spring to pull it including the handle 1 in the direction of the arrow 1c toward the starting position, namely to position 1 which indicates the daylight exposure range. If the camera is to be changed from the starting position 1 to the position 1a signifying the automatic daylight exposure range, then this is done against the action of said spring and the carrier 2 including the handle remaining the flash exposure position 1a only as long as the operator's finger retains the handle in the flash exposure position 1a. Immediately upon release of the handle the spring causes the handle to return from position 1a to position 1.

The carrier 2 is also provided with a guide number preselection mechanism consisting essentially of a disc-shaped member 3 having arranged thereon a guide number scale 4 and two diametrically opposed upwardly extending operating pins 3a and 3b. The guide numbers on this scale 4 are adapted to be brought into registration with an index 5 provided on the carrier 2. Instead of a single index may be provided individual adjustment marks as shown at 5a in the event that interchangeable objectives are used. These marks preferably designate the focal lengths of the objectives, for example 32 mm. and 45 mm.

The carrier 2 is so constructed as to be sluggish in its movability or it may be locked with respect to the disc 2a on which the guide number scale 4 is arranged, for the purpose of retaining a once selected guide number until another guide number is positively selected and in order to rotate the guide number computer together with the handle as a unit.

Connected with the disc 3 carrying the guide number scale 4 is a downwardly extending shaft 6 which at its lower end is provided with a circular member 7 provided with a guide number deflecting cam 8 and a disconnecting cam 9. This member 7 is fixedly connected with the shaft 6, and the mentioned cams 8 and 9 are constructed in the form of axially extending cup-shaped or elevated cams. From the placement of the cams with respect to the guide number scale on the one hand and from the positions 1 and 1a of the handle 1 on the other hand it will be readily seen that the guide number deflecting cam 8 is effective and operative when the automatic flash bulb range is selected and one of the guide numbers has been set. It is furthermore apparent that the guide number deflecting cam 8 is inoperative when the automatic flash bulb exposure range is replaced by the daylight exposure range.

Cooperating with the mentioned cams 8 and 9 is the vertically disposed slide bar 11 acting as a scanning member and being provided at its upper end with a rectangularly deflected section 10 which engages the cam 8 on the member 7. The slide bar 11 is pretensioned by a spring 15 which engages with one end a rectangular extension 14 on the slide bar 11 and with its other end is fastened at 14a to a wall portion of the camera casing. The slide bar 11 is vertically movable and supported by pin-slot connections 12, 13, and another slot 31 in the slide bar 11 is arranged perpendicularly with respect to the slots 12, 13 and receives loosely therein an operating pin 30. It will be readily understood that in relation to the specific elevation of the cams 8 and 9 the slide bar 11 performs perpendicular up and down scanning motions which are transferred as control movements to a lever differential means and from the latter to the diaphragm mechanism of the camera.

The lever differential means consists first of all of a lever 32 one end of which is attached to the pin 30. Guide number scanning motions of the slide bar 11 are therefore translated into rotative movements of the lever 32 about the axis of the pin 30 when the latter is raised or lowered, whereby these rotations of the lever 32 represent the selected guide number value provided the aforedescribed guide number computer has been set to the flash exposure range.

A second lever 34 of the lever differential serves for introducing the selected distance value which must be superimposed on the selected guide number value. For this purpose the lever 34 which is rotatable about a fixed axis 36 is at 33 pivotally joined to the guide number lever 32 at a short distance from the pin 30, and by means of a perpendicularly downwardly extending section 37 and a pin 38 thereon scans or engages a distance deflecting cam which is arranged on the distance adjusting ring, but for the sake of clarity this cam is not illustrated. It is evident that the axial movements of the pin 38 brought about by the distance deflecting cam and the rotative movements of the lever 34 are transferred by reason of its joint connection 33 with the lever 32 to the latter in such a manner that the far end 39 of the lever 32 in its position embodies the sum of both deflections.

This deflection sum is fed to a semi-circular lever 41 which extends around the camera objective and is rotatable about an axis 47 which extends parallel to the optical axis of the camera objective. This lever 41 has at one end an outwardly extending projection 40 which engages the lever end 39, while a rectangularly bent portion 42 at the same end of this lever 41 engages a projection 43 on the diaphragm control ring 44. A spring 35 acting upon the center of the semi-circular lever 41 effects an engagement of the projection 40 with the lever end 39, while a spring 45 attached at 46 to the diaphragm control ring 44 provides a positive coupling between the projection 43 and the projection 42 on the lever 41. The lever 41, then, serves as a transmitting member of the sum of the inputs of guide number and distance to the diaphragm mechanism. Therewith, however, its transmitting task is not completed yet, because in addition thereto it also conveys the scanning result of the position of the pointer of the exposure meter which determines the value of the automatic daylight diaphragm in the automatic daylight exposure range. This scanning result is substantially obtained in that the pointer 51 of the instrument 53 upon release of the camera swings in the direction of either one of the indicated arrows and is pressed against the stationary abutment 52 by the action of not illustrated springs which impel a scanning member 50 with steps thereon upwardly against the pointer 51 whereby the final position of the member 50 depends upon the position of the deflected pointer 51. Between the scanning member 50 and the end 48 of the semi-circular lever 41 is provided a slidably mounted vertical bar 49, the lower end of which is kept in positive engagement with the lever end 48 by the action of the spring 35, since the axis 47 is arranged between the ends of the lever extension 48. The diaphragm control ring 44 which extends concentrically about the optical axis 54 of the camera objective follows the lever 41, or rather its projection 42, under the action of the spring 45, and the diaphragm aperture corresponding to the measured exposure value is formed in relation to the scanning position of the steps on the scanning member 50 of the diaphragm mechanism.

It has already been indicated in the foregoing that on leaving the flash bulb operating range the guide number deflecting cam 8 has moved away from the scanning projection 10 and that now the cam 9 is being scanned which is of a much lesser elevation than the cam 8 and tapers off to an even height. The vertical slide bar 11 due to the action of the spring 15 reaches its greatest elevation when the cam 9 engages the section 10 of the slide bar 11, which means that the lever 32 is lifted and thereby is pivoted clockwise about the axis of the pin 30 such a distance that the far end 39 of the lever 32 moves away from the projection 40 of the lever 41 quite a distance. This distance is such that all deflecting motions emanating from the distance cam remain ineffective relative to the formation of the diaphragm aperture and this assures the adjustment of distances in the automatic daylight exposure range without causing a change in the diaphragm value.

The carrier 2 of the handle 1 is further provided with a downwardly extending control pin 16 which cooperates with a horizontally disposed slide bar 17 guided slidably in pin and slot connections 19 and having at one end a bevelled edge 18 which is in contact with the pin 16. This slide bar 17, of whose slot and pin connections 19 only one is illustrated, is provided between its ends with a lateral projection 20 which is engaged by a spring 21 which keeps the edge 18 of the slide bar 17 in positive engagement with the pin 16.

Preferably, by moving the slide bar 17 to the right in the direction of the arrow 17a, a flash exposure of for instance 1/30 second is automatically adjusted; furthermore, a cover-up and indicating device is actuated by which in the flash exposure range the reflection of a red-green indication of the automatic daylight exposure range is covered, and if desired, a flash symbol is introduced into or adjacent the viewfinder area. Provision is also made for a switch device to be operated by the slide bar 17, which has the effect that in the automatic daylight exposure range the flash circuit is interrupted while in the flash exposure range this circuit is closed. In single lens mirror reflex cameras the flash symbol may preferably be introduced in the viewfinder ray path in the center of the Fresnel lens.

This arrangement has the great advantage that the camera user who frequently works with the same guide number, has to set the guide number only once on the guide number preselection member and that, if he wishes to change from the automatic daylight exposure range to the automatic flash exposure range, he merely needs to adjust a handle by the pressure of a finger which readies the camera for automatic flash operation by simultaneously introducing the preselected guide number. The bothersome recurring setting of the desired guide number on the change-over ring is therewith eliminated. In a second's time the camera is changed from the automatic daylight exposure range to the automatic flash exposure range. If again automatic daylight exposures are desired to be made, then it is merely necessary to let go of the handle which returns to its initial position and therewith renders the automatic daylight exposure range again operative under automatically reinstating the previously selected exposure time.

With 28 is designated the warning signal circuit which includes the preferably red warning lamp 29 and is fed by a battery 55. The unilateral connection of the warning signal circuit 28 to the common camera ground pole 27 is effected by contacts 54a, 54c of an operating range main switch 54 when the flash exposure range is turned on. The switch spring 54c of the mentioned main switch 54 cooperates with an abutment pin 22 of the slide bar 17 so that the contacts 54a and 54c are closed when due to the selection of the flash exposure range on the range selection member 1, 2 the slide bar 17 has reached its right-hand terminal position caused by the influence of the coupling pin 16 on the incline 18. For a battery 55 serves a source of current which is preferably already present in the camera and which feeds the circuit of the exposure control device including a photocell as well as the flash unit for the flash exposure range.

In the operative region of the section 37 of the lever 34, the position of which depends on the distance setting, are arranged the switches 25 and 26 in such a manner that the switch 25 is closed when a distance of eight meters is selected, while the switch 26 closes its contacts at a distance selection of one meter. Owing to these switches which are arranged in parallel, it is assured that the warning lamp circuit is closed when the distance range generally permissible for flash exposures is exceeded for small distance values as well as for large distance values. Due to the action of these switches the camera user is able to already see in the viewfinder that he has to select less smaller or less larger distance values if he wants to obtain a satisfactory flash picture. The eight meter-actuating position of the section 37 is designated with 37a and its one meter-position is designated with 37b, both positions being indicated by broken lines.

The limits of the diaphragm adjustment range which may be given with 2.8 on one hand and with 22 on the other hand do not become visible in the viewfinder due to a circuit which is provided with contacts merely in combination with the distance adjusting member, but are only felt on arriving at the diaphragm range stops. To make these adjustment limits visible in a finder, switches are required which are controlled by a diaphragm control member.

Switches of this type are indicated in the drawing at 23 and 24. These switches lie in the sphere of influence of the summation lever 32 or of the transition lever 41 controled by the lever end 39 of the summation lever 32, respectively. The end 40 of the lever 41 serves as a direct control member for the switches 23, 24. When the lever end 40 is in the position 40a shown in broken lines, the switch 23 is closed and this takes place as soon as the maximum diaphragm aperture of 2.8 has been reached. Correspondingly, the broken-line position 40b of the lever end 40 represents that position of the transition lever 41 which signifies the smallest possible diaphragm aperture of 22 and in which the switch 24 is closed. All of the aforementioned control positions of the lever 41 or its end 40, respectively, depend on the position of the lever 32 or its end 39, respectively, as this lever 32 or its end 39, respectively, combines in itself the sum of all selections of guide number and distance. It would also be possible to have the lever end 39 itself engage the diaphragm control ring 44 or the projection 43 of it, respectively, and to let the lever end 39 simultaneously also control the contacts 23 and 24. Finally, the contacts 23 and 24 could also be controlled by a part of the diaphragm mechanism itself set into action along with the formation of the diaphragm.

By the closing of the switches 23 and 24 and the appearance of a warning light in the viewfinder, the photographer is alerted to his approaching the limits of the diaphragm aperture relations of the objective. Thus, he is made to know that any further manipulation of the camera adjusting members along the course taken can only lead to a further strain on the stops of the respective operating range in the diaphragm mechanism and he better check.

Combining the switches 25, 26 with the switches 23, 24 results in the possibility of a guide number dependent limitation of the available distance range as it has already been described in detail in the foregoing by way of numerical examples. From this disclosure it has become clear that a change in distance affects the lever end 39 which combines the sum of the guide number and distance settings and this results in a change of the diaphragm aperture; further, that with a constant guide number an impermissible distance value and a diaphragm aperture exceeding the existing limits may be rectified in that the distance setting is modified until a producible diaphragm aperture is ascertained.

In order to assign a function to the operating range main switch 54 also in the automatic daylight exposure range, said switch is preferably constructed as a contact changer in which the contact spring 54c is provided on each side with a contact and cooperates with a further contact spring 54b. These contacts 54c and 54b are disposed in the circuit of the already mentioned automatic daylight exposure mechanism 56, 56a which is fed by the same battery 55 and which need not be described here in detail as it is inconsequential of the invention.

The indication formed by the warning lamp 29 may appear in or adjacent the viewfinder. Either the warning lamp is directly installed in the viewfinder or it is arranged at a different place and its lighting up is reflected by optical means into the viewfinder or somewhere adjacent to it.

According to another feature of the invention, it is also possible that the warning lamp 29 illuminates either directly or indirectly, i.e. by reflection, a duplicate of the diaphragm scale provided in or at the viewfinder so as to caution the photographer if a flash diaphragm aperture assuring a correct exposure is not possible under the given conditions.

It is understood that the invention is applicable also to multi-range cameras having a range changing ring which requires a fresh guide number selection with each change of range.

What I claim is:

1. A photographic camera provided with a daylight exposure range and an automatic flash exposure range, a distance adjusting means and a diaphragm adjusting means, said flash exposure range comprising guide number adjusting means, and means including interconnected pivotally mounted members for automatically adjusting the aperture of the diaphragm by scanning preselected values on said distance adjusting means and on said guide number adjusting means and transfer the sum of said distance and guide number values thus obtained to said diaphragm adjusting means, the improvement comprising a warning signal circuit including a pair of switches (23, 24) which is so arranged with respect to said guide number adjusting means that said warning signal circuit is closed when reaching the smallest possible and the largest possible diaphragm aperture, respectively, said pair of switches being arranged in parallel and being controlled by one (39) of said pivotally mounted members, said warning signal circuit also including another pair of switches (25, 26) which is controlled by said distance adjusting means of the camera, said other pair of switches being arranged also in parallel and being controlled by another one (37) of said pivotally mounted members in such a manner that one of said last named switches is closed by said distance adjusting means when the lowest permissible distance value is reached, while the other one of said last named switches is closed when the highest permissible distance value is exceeded.

2. A camera according to claim 1, including an operating range main switch in said warning signal circuit which is closed when the camera is adjusted to the automatic flash exposure range, said operating range main switch being arranged in the flash circuit in such a manner that said flash circuit is closed when the camera is adjusted to the said automatic flash exposure range.

3. A camera according to claim 1, including an operating range main switch in said warning signal circuit which is closed when the camera is adjusted to the automatic flash exposure range.

4. A camera according to claim 3, in which said operating range main switch is constructed as a contact changer having a contact which closes the automatic exposure circuit upon selection of the automatic daylight exposure range, and having another contact which closes the flash circuit and the warning signal circuit upon selection of the automatic flash exposure range.

References Cited
UNITED STATES PATENTS

| | | | |
|---|---|---|---|
| 3,191,512 | 6/1965 | Lind | 95—11 |
| 3,393,620 | 7/1968 | Reiche | 95—11 |
| 3,406,620 | 10/1968 | Hochreiter | 95—11 |
| 3,424,071 | 1/1969 | Schwahn | 95—11.5 |

NORTON ANSHER, Primary Examiner

M. H. HAYES, Assistant Examiner

U.S. Cl. X.R.

95—45, 64; 116—114.10; 352—171